UNITED STATES PATENT OFFICE.

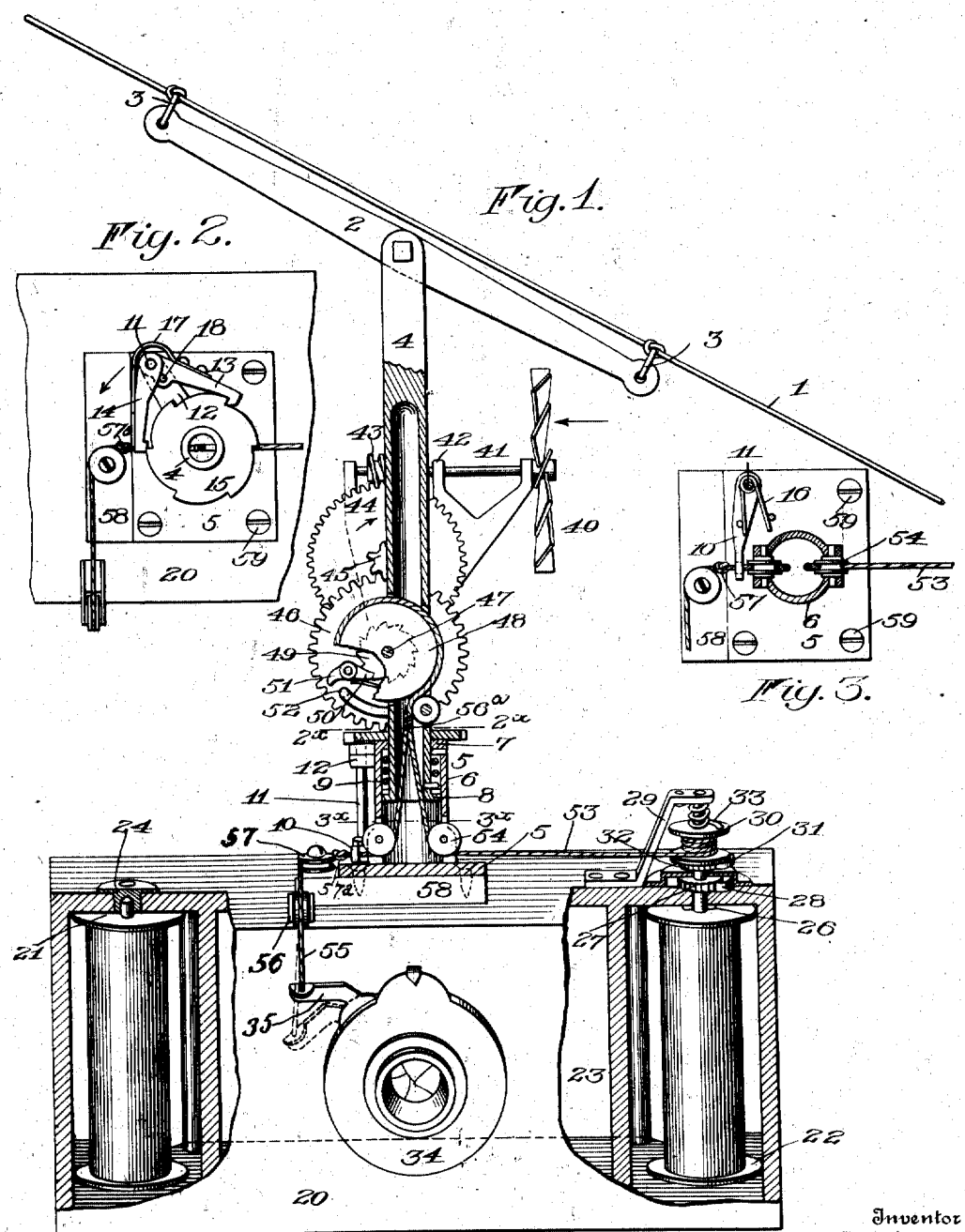

NAT ELMER BROWN, OF GRAND HAVEN, MICHIGAN.

AERIAL PHOTOGRAPHIC APPARATUS.

1,002,897.  Specification of Letters Patent.  Patented Sept. 12, 1911.

Application filed July 17, 1909. Serial No. 508,107.

*To all whom it may concern:*

Be it known that I, NAT ELMER BROWN, of Grand Haven, in the county of Ottawa and State of Michigan, have invented certain new and useful Improvements in Aerial Photographic Apparatus; and I do hereby declare the following to be a full, clear, and exact description of the same, reference being had to the accompanying drawings, forming a part of the specification, and to the reference-numerals marked thereon.

My present invention relates to the photographic art and has for its object to provide an apparatus adapted for use particularly in taking aerial photographs by means of a camera suspended in any suitable manner, as from a kite string or a captive balloon, at any desired elevation above the surface of the ground.

More specifically my invention comprehends an apparatus designed to be used in conjunction with a camera of the usual or any preferred construction, and comprising operating mechanism, whereby the camera may be automatically rotated; successive portions of the sensitized photographic surface brought into exposure position and the shutter operated, to enable one or more negatives to be made or pictures taken while said apparatus, and the camera, are out of reach of the operator and beyond his control.

To these and other ends the invention consists in certain improvements and combinations of parts all as will be hereinafter more fully described, the novel features being pointed out in the claims at the end of the specification.

In the drawings: Figure 1 is an elevation partly in section showing one embodiment of mechanism employed for carrying out my invention. Fig. 2 is a horizontal sectional view taken on the line 2×—2× of Fig. 1, showing the escapement, and Fig. 3 is a similar view taken on the line 3×—3× of Fig. 1.

Similar reference numerals in the several figures indicate similar parts.

In aerial photography, which is the making of photographic negatives, or the taking of pictures at an elevation, it is necessary to support the camera box at the desired elevation and as one means of illustrating such a support, I have shown in the present instance a kite string, indicated by 1. The apparatus in conjunction with a camera comprises generally suspension devices, adapted to be attached to the kite string, or other support, at any desired point, on which is mounted the camera box and the operating mechanism for controlling the various operations which successively occur when it is desired to make an exposure or a plurality of exposures. The supporting device proper comprises a boom 2 which may be connected to the kite string 1 by suitable fastening devices or ties 3—3, preferably arranged at its ends. Suspended at an intermediate point and depending vertically from the boom is a bar or rod 4, on the lower end of which is a turntable or head 5 to which the camera box is attached. The turntable comprises a tube 6 embracing the lower end of the rod 4 and having at its upper end the flange 7. The lower end of the rod 4 is provided with a similar flange 8 and between the latter and the flange 7 is arranged a coil spring 9, one end of which is attached to the rod 4, the other extremity being fastened to the sleeve 6, said spring being of such a length that it may be wound up, before the kite is sent up by the relative rotary movement of the parts 4 and 6 and adapted when released to revolve the turntable, for the purpose of rotating the camera thereon, through one or more complete revolutions.

The rotary movement of the camera is automatically controlled in time relationship to the positioning of the sensitized photographic surface and the operation of the shutter employed for making the exposures, and the movement of the camera is preferably made in successive steps, said steps being preferably taken after the operation of the shutter has occurred. This step-by-step movement of the camera is controlled by an escapement mechanism actuated by a lever 10 attached to a rock shaft 11 pivoted on a laterally extending bracket 12 on the sleeve 6 and carrying escapement arms 13 and 14 having ends which coöperate with notches or teeth formed in the periphery of a disk 15 rigidly attached to the rod 4 above the sleeve 6. The arm 13 is rigid on the shaft 11 and is normally held in engagement with the disk by a coil spring 16, while the arm 14 is permitted to move on said shaft, in one direction, against the tension of a leaf spring 17 which normally holds it in engagement with a stop 18 placed on the arm 13 and so positioned as to limit the movement of the arm in the other direction. The operating ends of the two arms 13 and 14 are positioned relatively to each other and to the notches in the disk 15 (as shown in Fig. 2) so that when the rock shaft is oscillated to disengage the arm 13 the turntable being impelled by the spring 9 may rotate the distance represented by the space between adjacent teeth and be arrested by the arm 14 which is held in engagement with the disk by the spring 17. The releasing of the shaft 11 permits its spring 16 to move the arm 13 inwardly into the path of another tooth when the stop projection 18 engaging the arm 14, trips it into position in readiness to coöperate with the succeeding tooth or notch on the disk when the turntable is again released.

The type of camera I have employed for the purpose of the present illustration is of a form which may be made light in weight and comprises the box 20 in which are arranged at opposite sides the supports for spools 21, 22 between which extends the photographic sensitized surface or film 23. The holding spool 21 is journaled upon studs or supports, one of which is indicated at 24, while the winding spool 22 is similarly journaled at its lower end on a centering stud and at its upper end has a winding key 26. The latter is provided with a stem projecting exteriorly of the camera box and mounted thereon is a ratchet wheel 27 with which coöperates a pawl 28 for the purpose of preventing the backward movement of the key. The extremity of the key stem is journaled in a bracket 29 and beneath the latter is journaled a reel 30, one flange of which is provided with a pawl 31 engaging a ratchet wheel 32 attached to said stem and adapted to turn the latter in the direction to wind the film on the spool 22. Attached to the other flange of said reel is one end of a coil spring 33, the opposite extremity of which is connected to the bracket 29, so that the spring is placed under tension when the reel is revolved in the direction to rotate the winding spool, the tension of the spring acting to return the reel to its normal position when released.

The camera box is provided with the usual lens, the passage of rays of light therethrough being controlled by any suitable form of shutter, such as indicated by 34, the actuating or setting lever of which is indicated by 35.

The devices employed for controlling the rotary movement of the shutter, the shifting of the successive portions of the sensitized surface and the operation of the shutter, comprise a motor mechanism mounted on the rod 4, said motor mechanism being connected by suitable operating means with the reel 30, the escapement controlling lever 10 and the shutter setting or actuating member 35.

The preferred form of motor which I have found by practice to be admirably adapted to the purpose described, on account of its simplicity in construction, as well as the extreme lightness of its parts, comprises generally an air fan which is positioned to be driven by the current of air which, when the apparatus is suspended from a kite string, is always in the direction of said string. The fan is mounted to revolve freely and with little friction and on account of the velocity with which it may be rotated, by ordinary wind pressure, great power may be developed by a simple train of multiplying gears, which will be more than sufficient to provide the necessary power required to effect the various operations before described.

In the illustration I have shown the fan 40 mounted upon an arbor 41 journaled in suitable bearings upon a frame piece 42 and provided with a worm gear 43 which imparts rotary movement to a gear wheel 44. The latter is provided with a pinion 45 which in turn meshes with the teeth of a larger gear wheel 46. The arbor 47 of the wheel 46 carries a drum 48 provided at one end with ratchet teeth 49 with which coöperates the pawl 50 pivoted on the face of the gear wheel 46 and having a tail piece or extremity 51 adapted to coöperate with a finger or stop 52 lying in its path and attached to the bar 4. The pawl 50 is spring controlled and the relative arrangement of its end 51 and the tripping finger 52 is such that when the pawl has been disengaged from the teeth 49 and the drum 48 released the gear wheel 46 may continue to revolve, and as this movement is comparatively slow, ample opportunity is afforded to permit the drum to rotate in the reverse direction for the purpose of unwinding the cord or connection, previously wound thereon, and when the pawl has passed the finger, it will be released and the drum again locked to the gear wheel.

A simple form of operating connection between the power devices or motor mechanism may be made by employing a cord 53 attached at its opposite extremities to the drum 48 and to the reel 30, said cord being guided by an idler 54 attached to the sleeve 6, its upper stretch passing through the sleeve and the tubular end of the rod 4. Another cord 55 is connected to the shutter setting or operating lever 35 and extends upwardly passing over guiding pulleys 56 and 57 and through an aperture in the end of the escapement controlling arm 10. This cord is of a predetermined length and is spliced into the strands of the cord 53, at a point indicated by 56ª, in such position that when the cord 53 has been wound on the reel 48, and the desired length of film or photographic sensitized surface has been drawn into exposure position, the cord 55 will have been moved into the position shown in full lines moving the shutter setting or operating lever into actuated position, operating the shutter blades and making an exposure. The relative arrangement of these parts is such that the exposure is made just previous to the releasing of the pawl 50 and although the sensitized surface may be moving at the instant the exposure occurs, this produces no noticeable effect in the negative due to its slow movement during the short duration of the exposure and the short angular distance through which said surface may travel as compared with the focal distance of the object photographed. A knot or enlargement 57ª is placed in the cord 55 in position to engage the arm 10 and the continued winding movement of the drum 48 causes said arm to be actuated to release the turntable after the exposure has been made.

In some instances, especially when photographs are to be taken at a considerable elevation, it is desirable to point the camera in a downward direction so that it assumes more or less of an angle to the horizontal and to accomplish this I insert between the turntable or head 5 and the camera box a wedge-shaped filling piece 58, or the camera may be adjusted at the desired angle by means of the fastening devices or securing screws 59.

By means of mechanism constructed in accordance with my invention it is possible to take pictures at any desired elevation and a series of such pictures may be made successively. The shutter being operated successively as the various steps in the movement of the camera occur, a plurality of pictures will be obtained showing the complete horizon, or such portions thereof as the operator may desire to photograph.

An advantageous arrangement of the parts is obtained in the manner shown, as the camera may be positioned with its center of gravity in line with the suspension bar 4 permitting the latter to hang vertically and the weight being at the lower end of the bar tends to steady it, thus preventing the camera from swinging or vibrating. The supporting of the camera in this manner also possesses the advantage of reducing the friction between the turntable and the supporting bar, thus permitting the camera to be rotated easily, obviating the use of a heavy or powerful spring for this purpose. Further, this arrangement also permits the use of cords as operating connections between the motor mechanism and the parts actuated thereby, which greatly simplifies the construction of the apparatus as a whole, as said cords may be passed through the hollow hub of the turntable and the tubular end of the bar in which position said operating connections do not in any way interfere with the rotary movement of the camera.

I claim as my invention:

1. In aerial photographic apparatus, the combination with a support, a camera having a shutter, and means connecting the camera and support permitting the rotary movement of the former on the latter, of means for revolving the camera by a step-by-step movement and mechanism for operating the shutter in timed relation to each movement of the camera.

2. In aerial photographic apparatus, the combination with a support, a camera provided with a shutter, and means connecting the camera and support of means for revolving the camera and mechanism operated in timed relation therewith for operating the shutter successively at various points during the complete rotation of the camera.

3. In aerial photographic apparatus, the combination with a support, a camera having supports for a sensitized surface and devices for moving successive portions of the surface into exposure position, said camera being also provided with a shutter, of means connecting the camera and support, means for revolving the camera on its support, mechanism for actuating the sensitive surface moving devices relatively to the movement of the camera and also operating the shutter to successively expose the different portions of the sensitized surface.

4. In aerial photographic apparatus, the combination with a support, a camera having supports for a sensitized surface and devices for moving successive portions thereof into exposure position and a shutter, of means connecting the camera and support, means for rotating the camera by a step-by-step movement, mechanism for operating the devices which move the sensitized surface and means for tripping the shutter and releasing the camera for a successive step which are actuated each time an unexposed portion of the sensitized surface is brought into exposure position.

5. In aerial photographic apparatus, the combination with a support, a camera comprising supports for sensitized film, devices for winding the latter, and a shutter, means connecting the camera and support, means for rotating the camera in one direction on its support and a latch for holding it in adjusted position, of mechanism for actuating the film winding devices, the camera latch and shutter, said mechanism being so arranged that the latch and shutter are actuated each time after a predetermined length of the sensitized film has been placed in exposure position.

6. In aerial photographic apparatus, the combination with a support, a camera comprising supports for a sensitized surface and devices for moving successive portions thereof into exposure position and a shutter, of means connecting the camera and support, means for revolving the camera, coöperating members arranged between the support and camera for causing the movement of the latter to be taken by successive steps, one of said members being movable, motor mechanism for operating the devices for moving the sensitive surface and connections between said motor mechanism and the movable camera controlling member and the shutter for actuating them periodically relatively to the movement of the sensitized surface.

7. In aerial photographic apparatus, the combination with a boom, a suspended rod pivoted thereon and a roll film holding camera, embodying film winding devices and a shutter, means suspending the camera from the rod, means for revolving the camera and devices for controlling its movement, of a motor mounted on the rod and operating connections between the motor, the devices controlling the movement of the camera and the shutter.

8. In aerial photographic apparatus, the combination with a support, a camera having sensitized film winding mechanism and exposure devices, means connecting the camera and support of a motor mechanism also mounted on the support above the camera, and means operatively connecting the winding mechanism and exposure devices for actuating them.

9. In aerial photographic apparatus, the combination with a support, a camera having sensitized film winding devices and devices for making photographic exposures thereon, means connecting the camera and support of a wind motor and mechanism driven thereby for actuating the winding and exposure devices.

10. In aerial photographic apparatus, the combination with a support, a camera having sensitized film winding devices and devices for making an exposure thereof, means connecting the camera and support means for rotating the camera on the support and an escapement controlling said rotation, of a wind motor, mechanism operated thereby and an operating connection between the latter and the winding devices, another connection between said mechanism and the exposure devices, one of said connections being also arranged to coöperate with the escapement.

11. In aerial photographic apparatus, the combination with a support, a camera having sensitized film winding devices and a shutter, of means connecting the camera and support, a wind motor, mechanism driven thereby comprising a reel and cords extending from the reel and connected to the winding devices and shutter.

12. In aerial photographic apparatus, the combination with a support, a camera, means connecting it to the support and a motor mechanism also mounted on the support and comprising a reel, of devices on the camera for winding sensitized film embodying a reel, a cord connecting the two reels, a camera shutter and operating connection between it and the motor mechanism.

13. In aerial photographic apparatus, the combination with a tubular support, a camera, means connecting it to the support and a motor mechanism also mounted on the support and comprising a reel, of devices for winding sensitized photographic film contained in the camera also embodying a reel, a cord connecting the motor reel and winding reel and passing through the support, a camera shutter having an operating member and another cord connecting the latter to the motor reel.

14. In aerial photographic apparatus, the combination with a vertically extending rod, a camera, means for attaching it to the lower end of the rod with its center of gravity arranged in approximate alinement with said support, said camera embodying film holding and winding devices and a shutter, of a motor mechanism attached to said support above the camera, and operating connections between the motor, the film winding devices and shutter.

15. In aerial photographic apparatus, the combination with a vertically extending support, a turntable journaled on its lower end, means for rotating the turntable and an escapement controlling said rotary movement, of a camera attached to the turntable having film winding devices and a shutter, a motor mechanism mounted on the support and devices operated by said mechanism for actuating the winding devices, the shutter and escapement.

16. The combination with a camera having film winding devices comprising a reel, of a continuously operating motor mechanism embodying a reel, a cord connecting the two reels and adapted to drive the winding reel as it is unwound therefrom onto the motor driven reel, a trip for releasing the latter periodically and a spring for rotating the winding reel to rewind the cord thereon when the motor reel is released.

17. In aerial photographic apparatus, the combination with a support adapted to be suspended from a kite string and a camera having film winding devices and a shutter, of means connecting the camera and support, a wind motor mounted on the support comprising a fan so disposed as to face in the direction of the supporting kite string and operating connections between said motor and the film winding devices and shutter.

18. In aerial photographic apparatus, the combination with a motor mechanism, a reel, a pawl normally connecting the mechanism and reel which is adapted to be tripped periodically to release the reel, a camera having sensitized photographic surface exposing mechanism also comprising a reel, a cord connected to the latter for rotating it which is also connected to the motor reel, a spring for unwinding said cord from the last mentioned reel when it is released and rewinding it upon the other reel and means for tripping the pawl.

19. In aerial photographic apparatus, the combination with a support, a camera, means rotatably connecting the camera and support, means for rotating the camera and controlling devices for causing said movement to be taken in successive steps, of a wind motor and power multiplying mechanism driven thereby for automatically actuating said controlling devices.

NAT ELMER BROWN.

Witnesses:
C. C. COBURN,
ADRIANA GLENN.